United States Patent
Yamada et al.

(10) Patent No.: US 9,442,605 B2
(45) Date of Patent: Sep. 13, 2016

(54) DISPLAY DEVICE AND DISPLAY CONTROL SYSTEM

(71) Applicant: Panasonic Intellectual Property Management Co., Ltd., Osaka (JP)

(72) Inventors: Kazuhiro Yamada, Osaka (JP); Takashi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 14/592,977

(22) Filed: Jan. 9, 2015

(65) Prior Publication Data

US 2015/0123948 A1    May 7, 2015

Related U.S. Application Data

(63) Continuation of application No. PCT/JP2013/004170, filed on Jul. 4, 2013.

(30) Foreign Application Priority Data

Sep. 7, 2012  (JP) ................. 2012-196948

(51) Int. Cl.
*G06F 3/042* (2006.01)
*G06F 3/0354* (2013.01)
(Continued)

(52) U.S. Cl.
CPC ......... *G06F 3/0421* (2013.01); *G02F 1/13338* (2013.01); *G06F 3/03545* (2013.01); *G06F 3/042* (2013.01); *G06F 3/0416* (2013.01);
(Continued)

(58) Field of Classification Search
CPC .. G06F 3/03545; G06F 3/042; G06F 3/0416; G06F 2203/04109; G06F 3/0421; G02F 1/133533; G02F 1/13338
See application file for complete search history.

(56) References Cited

U.S. PATENT DOCUMENTS

| 5,430,462 A | 7/1995 | Katagiri et al. |
| 2004/0095337 A1 | 5/2004 | Pettersson et al. |

(Continued)

FOREIGN PATENT DOCUMENTS

| JP | 63-205724 | 8/1988 |
| JP | 6-175780 | 6/1994 |

(Continued)

OTHER PUBLICATIONS

International Search Report issued Aug. 6, 2013 in International (PCT) Application No. PCT/JP2013/004170.

*Primary Examiner* — Charles Hicks
(74) *Attorney, Agent, or Firm* — Wenderoth, Lind & Ponack, L.L.P.

(57) ABSTRACT

A display control system 100 includes: a display panel 220 that includes a pair of polarizing plates 250; a pattern layer 230 has formed therein a plurality of patterns 260; a light source 140 that emits light to be absorbed by the patterns 260; a reflector 240; an identification device 160 that reads the pattern 260 from the light which is emitted from the light source 140, is reflected on the reflector 240, and then passes through the display panel 220 and the pattern layer 230, and identifies a position, on the display surface, of the pattern 260; and a display controller 130 that controls display information in accordance with the position identified by the identification device 160. A transmittance of the pair of polarizing plates 250 at a peak wavelength of the light emitted from the light source 140 is not lower than 70%.

8 Claims, 6 Drawing Sheets

(51) Int. Cl.
  *G02F 1/1333* (2006.01)
  *G06F 3/041* (2006.01)
  *G02F 1/1335* (2006.01)

(52) U.S. Cl.
  CPC ............... *G02F1/133553* (2013.01); *G06F 2203/04109* (2013.01)

(56) References Cited

U.S. PATENT DOCUMENTS

| | | |
|---|---|---|
| 2004/0113898 A1 | 6/2004 | Pettersson et al. |
| 2005/0104861 A9 | 5/2005 | Pettersson et al. |
| 2006/0076416 A1 | 4/2006 | Pettersson |
| 2010/0096458 A1 | 4/2010 | Pettersson et al. |
| 2012/0193419 A1 | 8/2012 | Pettersson et al. |
| 2012/0229423 A1* | 9/2012 | Takamiya ............ G02B 1/105 345/175 |
| 2012/0263381 A1 | 10/2012 | Yoshida |

FOREIGN PATENT DOCUMENTS

| | | |
|---|---|---|
| JP | 06-290257 | 10/1994 |
| JP | 2000-082337 | 3/2000 |
| JP | 2002-014348 | 1/2002 |
| JP | 2006-141061 | 6/2006 |
| JP | 2007-226577 | 9/2007 |
| JP | 2008-209598 | 9/2008 |
| JP | 4385169 | 12/2009 |
| JP | 2011-073353 | 4/2011 |

* cited by examiner

DISPLAY DEVICE AND DISPLAY CONTROL SYSTEM

BACKGROUND

1. Field

The present disclosure relates to a display device which allows a pointing input to be performed on a display panel by using a pointing device, and a display control system.

2. Description of the Related Art

Japanese Laid-Open Patent Publication No. 2007-226577 discloses a pen input system in which by using a camera-equipped pen with respect to a paper having printed thereon a pattern from which an absolute position is allowed to be identified, an absolute position is detected from the pattern, and information written on the paper by the pen is computerized.

The pen input system disclosed in Japanese Laid-Open Patent Publication No. 2007-226577 includes a pattern section, an identification section which identifies an absolute position, and a recording section which records the identified position. Thus, it is possible to computerize information written on the paper.

SUMMARY

The present disclosure provides a display control system that includes a pattern layer having formed therein a plurality of patterns each presenting information regarding a position on a display surface and that has improved accuracy of reading the pattern.

A display control system according to the present disclosure includes: a display panel that includes a pair of polarizing plates having transmission axes perpendicular to each other, the display panel being configured to display a visible image on a display surface thereof by using the pair of polarizing plates; a pattern layer that is disposed so as to overlap the display surface and has formed therein a plurality of patterns each representing information regarding a position on the display surface; a light source that emits light to be absorbed by the patterns, from a front side of the display panel; a reflector that is provided at a back side of the display panel and the pattern layer; an identification device that reads the pattern from the light which is emitted from the light source, is reflected on the reflector, and then passes through the display panel and the pattern layer, and identifies a position, on the display surface, of the pattern; and a display controller that controls display information to be displayed on the display panel, in accordance with the position identified by the identification device. A transmittance of the pair of polarizing plates at a peak wavelength of the light emitted from the light source is not lower than 70%.

The display control system according to the present disclosure allows accuracy of reading the pattern to be improved without influence of a display state of the display panel.

DETAILED DESCRIPTION

Hereinafter, an embodiment will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Embodiment 1

Hereinafter, Embodiment 1 will be described with reference to FIGS. 1 to 6.

1. Outline of Display Control System

Figure 1:
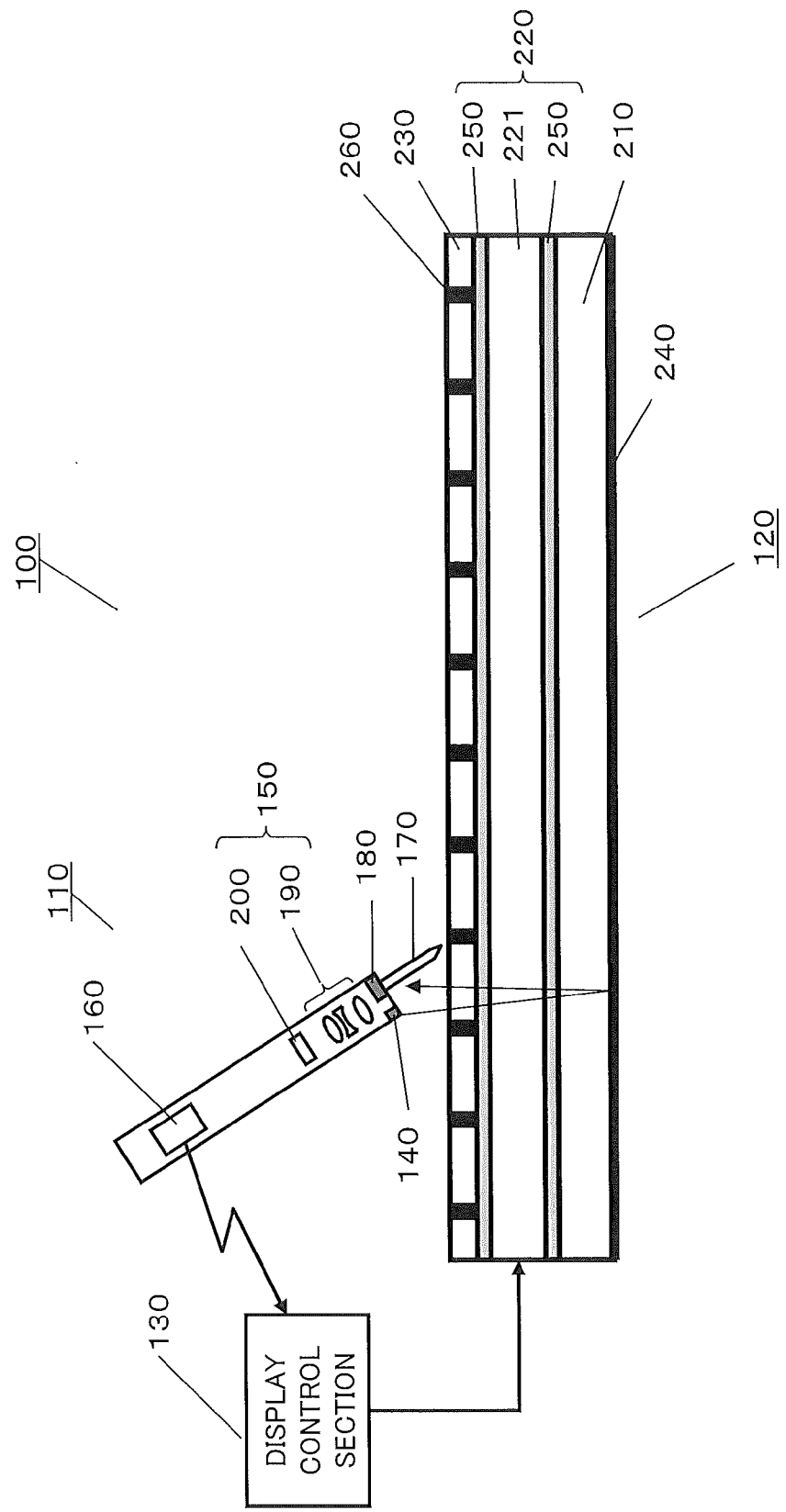
FIG. 1 is a schematic diagram of a display control system according to Embodiment 1.

FIG. 1 is a schematic diagram of a display control system 100 according to Embodiment 1. The display control system 100 includes a pointing device 110, a display device 120, and a display control section 130. The pointing device 110 is a pen type input device. The pointing device 110 includes a light source 140, an imaging section 150, a position identification section 160, a pen tip 170, and a pressure sensor 180. The light source 140 is a light source (e.g., an LED) which emits infrared light. The imaging section 150 includes an optical system 190 and an image sensor 200. The optical system 190 causes light incident from the tip side of the pointing device 110 to form an image on the image sensor 200.

The display device 120 includes a backlight 210, a liquid crystal display section 220 (liquid crystal display panel), and a pattern layer 230. The backlight 210 is, for example, an edge type backlight. The backlight 210 is not limited to the edge type. The backlight 210 includes a display light source which emits visible light and a diffuse reflection plate 240 which is disposed at a back side (a lower side in FIG. 1) of a light guide plate of the display light source. The backlight 210 includes the diffuse reflection plate 240 therein. The diffuse reflection plate 240 corresponds to a reflection section provided at a back side of the liquid crystal display section 220 and the pattern layer 230. The liquid crystal display section 220 includes two polarizing plates 250 which polarize light, and a liquid crystal layer 221. The liquid crystal layer 221 is interposed between the two polarizing plates 250 having transmission axes perpendicular to each other. The liquid crystal display section 220 includes a plurality of pixels (not shown). The liquid crystal display section 220 displays a visible image on a display surface thereof by using a pair of the polarizing plates 250. The pattern layer 230 is disposed so as to overlap the display surface. A plurality of patterns 260 (information patterns) which absorb emission light (infrared light) of the light source 140 are formed in the pattern layer 230.

Figure 2:
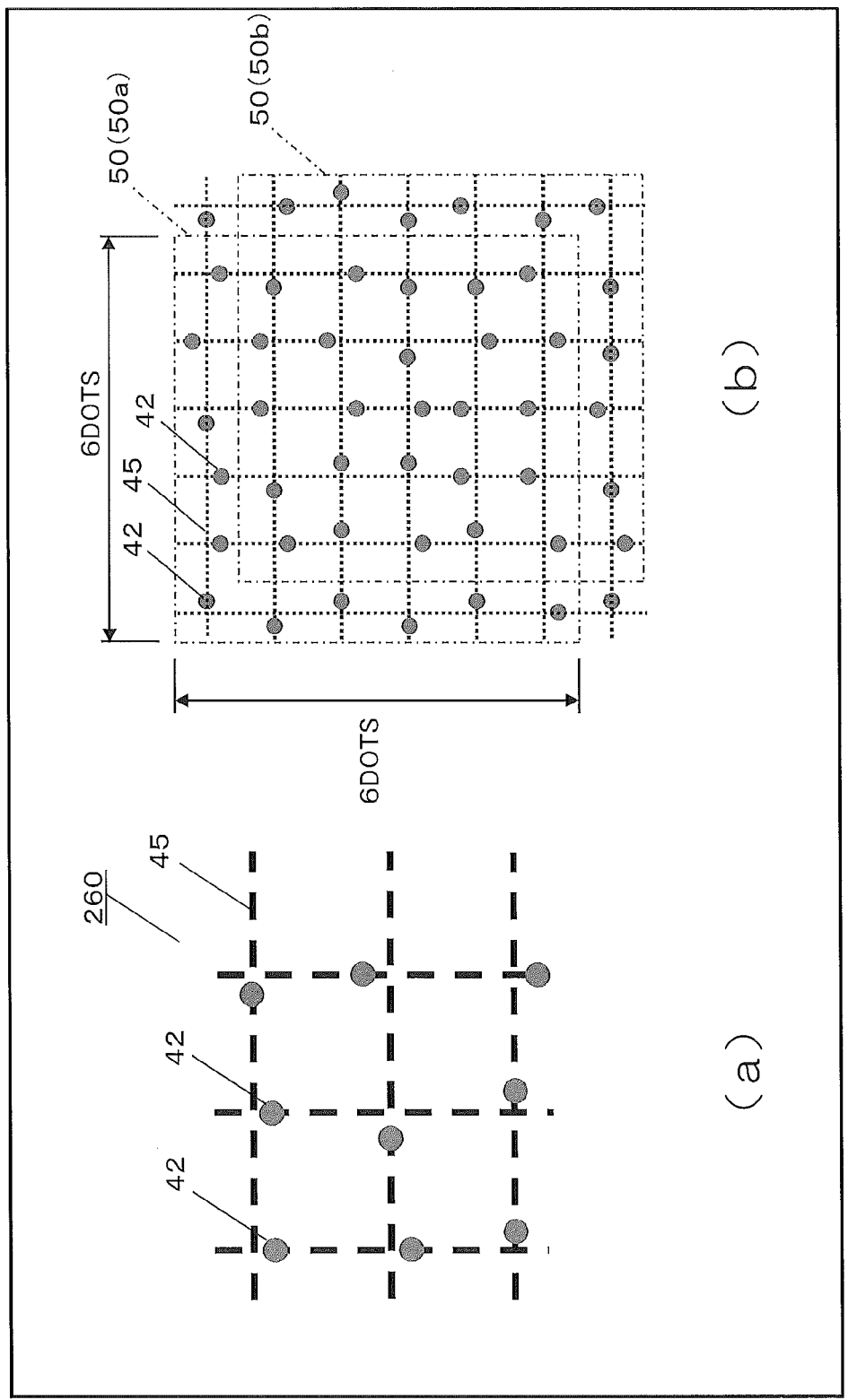
FIG. 2 is an enlarged view of a pattern layer of a display device according to Embodiment 1.

FIG. 2 is an enlarged view of the pattern layer 230. Each pattern 260 is composed of a plurality of dots 42. Each dot 42 is arranged on the basis of a grid point of a virtual grid 45 shown in FIG. 2(a). Each pattern 260 is composed of, for example, 36 dots 42 within an area 50 of 6 dots×6 dots shown in FIG. 2(b). Each pattern 260 represents information regarding a position on the display surface (display area) of the display device 120 by the arranged position of each dot 42 (a position with respect to the grid point). All the patterns 260 are different from each other. One pattern 260 represents one coordinate (a coordinate on the display surface). In FIG. 2(b), patterns 260 in areas 50a and 50b represent, for example, coordinates of the center positions of the areas 50a and 50b, respectively. The pointing device 110 reads the pattern 260 in one area 50. For example, when the pen tip 170 moves diagonally downward right in FIG. 2(b), an area 50 read by the pointing device 110 is changed from the area 50a to the area 50b.

In the display control system 100, when a user writes a character or the like on the display surface of the display device 120 with the pointing device 110, the user brings the pen tip 170 of the pointing device 110 into contact with a screen of the display device 120. Then, the pressure sensor 180 detects a pressure applied from the display device 120 to the pen tip 170, thereby detecting that the pen tip 170 has contacted the display device 120. Then, when the contact of the pen tip 170 is detected by the pressure sensor 180, the light source 140 emits light toward the screen of the display device 120.

The pointing device 110 optically reads the pattern 260 with the imaging section 150 by using the light emitted by the light source 140. The image sensor 200 of the imaging section 150 converts an optical image formed on an imaging surface thereof to an electrical signal to generate image information (an image signal). Then, on the basis of the image information from the imaging section 150, the position identification section 160 identifies, as position information, the position, on the display surface, of the pattern 260 read by the imaging section 150. Accordingly, on the basis of the pattern 260, which represents information regarding a position of the pointing device 110 on the liquid crystal display section 220, the position identification section 160 identifies the position of the pointing device 110 as position information. The identified position information is transmitted to the display control section 130. The display control section 130 controls display of the display device 120 on the basis of the received position information. For example, the display device 120 continuously displays points on the liquid crystal display section 220 in accordance with a trajectory of the pen tip 170 of the pointing device 110. Accordingly, it is possible to perform a handwriting input of a character, a figure, or the like on the liquid crystal display section 220 with the pointing device 110. Or, the display device 120 continuously deletes points displayed on the liquid crystal display section 220, in accordance with a trajectory of the pen tip 170 of the pointing device 110. Accordingly, it is possible to delete a character or a figure on the liquid crystal display section 220 by using the pointing device 110 like an eraser. That is, the pointing device 110 serves as a reading device as well as an input device that performs an input to the display control system 100.

Reading of the pattern 260 by using the emission light of the light source 140, etc. will be described. The light emitted from the light source 140 passes through the pattern layer 230 and the liquid crystal display section 220, reaches the diffuse reflection plate 240 of the backlight 210, and is diffusely reflected thereon. As a result, regardless of a tilt of the pointing device 110, part of the infrared light having passed through the liquid crystal display section 220 returns to the pointing device 110 side. The light made substantially uniform by the diffuse reflection passes again through the liquid crystal display section 220, which includes the polarizing plates 250, to illuminate the pattern layer 230 from its back side. Each pattern 260 is formed from a material that absorbs the infrared light emitted by the light source 140 (light having the wavelength of the light source 140) (a material having a low transmittance for the infrared light emitted by the light source 140). The light having passed through the pattern layer 230 is spatially intensity-modulated. That is, in the pattern layer 230, in a region where the patterns 260 are formed (a region where the dots 42 are formed), the intensity of emission light greatly decreases as compared to incident light, and in a region where no pattern 260 is formed (a region between the dots 42), the intensity of the emission light is almost the same as that of the incident light. The light having passed through the pattern layer 230 is incident on the optical system 190 of the pointing device 110. The optical system 190 causes the light incident thereon to form an image on the imaging surface of the image sensor 200. As a result, a spatial intensity distribution of the light having passed through the pattern layer 230 is obtained as image information by the imaging section 150. With the image sensor 200, an image in which the pattern 260 is represented in black on a white background is captured. The image information obtained by the imaging section 150 is collated with design information of the pattern 260 (e.g., information in which the pattern 260 and a position coordinate are associated with each other in a one-to-one relation) by the position identification section 160, and the absolute position (e.g., the position coordinate) of the pattern 260 in the pattern layer 230 is identified on the basis of a result of the collation. The display control section 130 controls display information of the liquid crystal display section 220 in accordance with the absolute position identified by the position identification section 160. Accordingly, it is possible to perform a pointing input on the display device 120 by using the pointing device 110. The position identification section 160 may transform the pattern 260 to a coordinate on the display surface on the basis of the arranged pattern of the 36 dots 42 of the pattern 260 by using a determined method. As a method of patterning or coordinate transformation of the pattern 260, for example, a publicly known method as disclosed in Japanese Laid-Open Patent Publication No. 2006-141061 may be used.

In the liquid crystal display section 220, the transmittance of the polarizing plates 250 for the emission light (visible light) of the backlight 210 is changed by changing the orientation state of crystal molecules of each pixel of the liquid crystal layer 221. By controlling the transmittance of each pixel for the visible light, the liquid crystal display section 220 displays a character or a figure. In order to control the transmittance for the visible light, each polarizing plate 250 has a polarization characteristic for at least visible light of 400 nm to 700 nm (a characteristic to transmit only light having a vibration direction parallel to the transmission axis thereof, namely, a characteristic to shield light other than light having a vibration direction parallel to the transmission axis thereof). If each polarizing plate 250 has a polarization characteristic for the wavelength of the emission light of the light source 140, the emission light of the light source 140 is spatially intensity-modulated due to a difference between the orientation states of the crystal molecules of the respective pixels of the liquid crystal layer 221 when passing through the liquid crystal display section 220. When the emission light of the light source 140 is spatially intensity-modulated by the liquid crystal display section 220, background light of the pattern 260 whose image is captured by the imaging section 150 becomes non-uniform. Thus, it becomes difficult to read the pattern 260 from the image captured by the imaging section 150. Therefore, in the present embodiment, a wavelength for which each polarizing plate 250 substantially does not have a polarization characteristic is selected as the wavelength of the emission light of the light source 140.

A wavelength characteristic required in order to achieve both identification of the position of the pattern 260 and a desired display brightness will be described in detail.

[1-1. Display Section]

Figure 3:
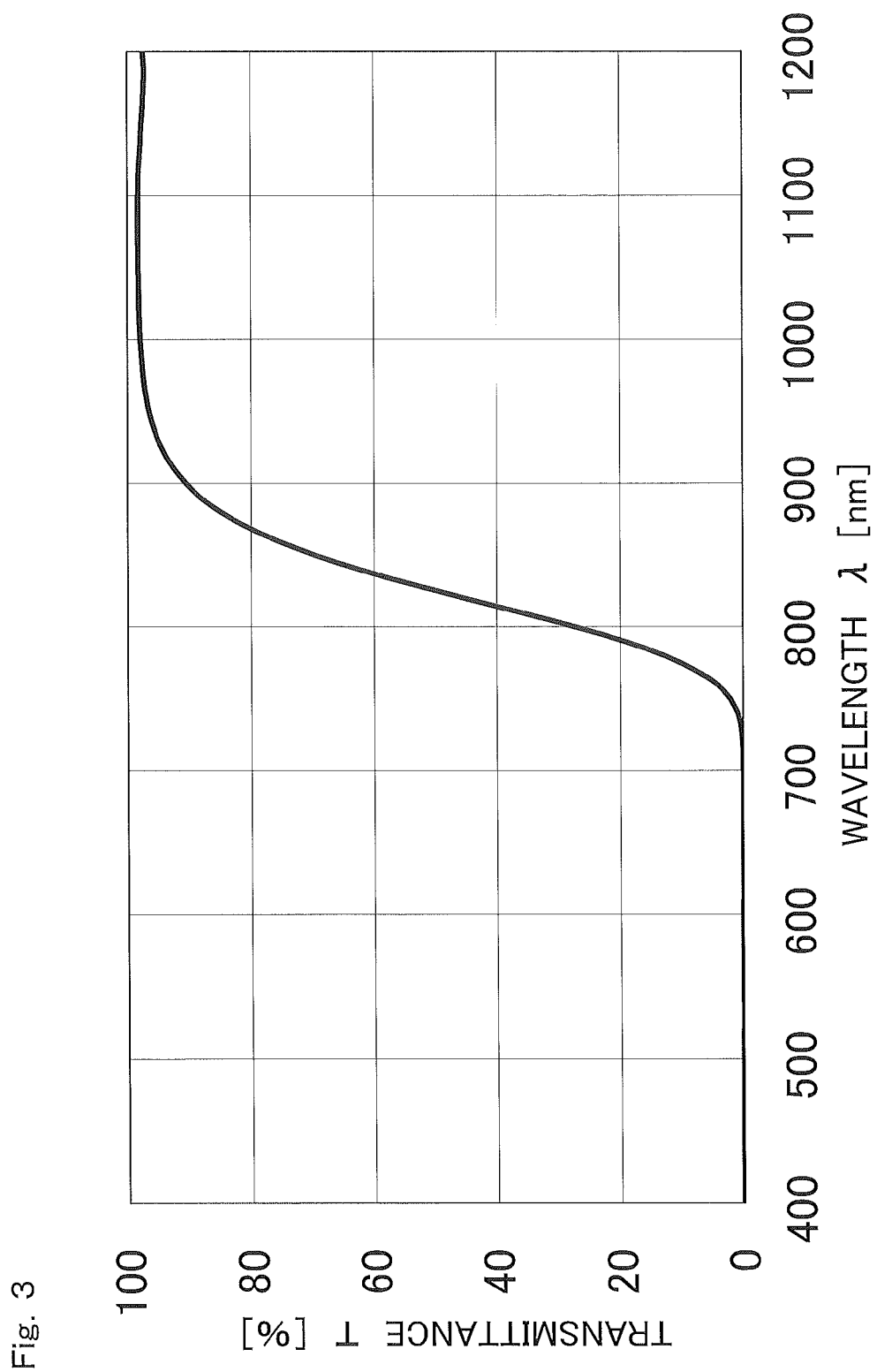
FIG. 3 is a diagram showing a wavelength characteristic of a transmittance when transmission axes of two polarizing plates used in a liquid crystal display section according to Embodiment 1 are made perpendicular to each other.

FIG. 3 is a diagram showing an example of measured values of a wavelength characteristic of a transmittance when the transmission axes (polarization directions) of the two polarizing plates 250 used in the liquid crystal display section 220 according to Embodiment 1 are made perpendicular to each other. A measurement sample is an NPF polarizing plate manufactured by Nitto Denko Corporation, and is one of polarizing plates which are generally used in liquid crystal display devices. Transmittance measurement is conducted in a state where the transmission axes (polarization axes) of the two polarizing plates 250 are made perpendicular to each other. According to FIG. 3, in the wavelength characteristic of the transmittance of the two polarizing plates 250, the transmittance starts to rise around a wavelength of 750 nm and becomes equal to or higher than 90% around 900 nm. That is, the combination of these two polarizing plates 250 does not substantially have a polarization characteristic for light of 900 nm or higher. Therefore, in the present embodiment, in order to avoid the orientation state of the crystal molecules of each pixel of the aforementioned liquid crystal layer 221 from adversely affecting reading of the pattern 260, the pattern 260 is read with light having a wavelength of not lower than 900 nm. That is, a light source 140 having a peak wavelength (a wavelength at which the light intensity is maximum) of not lower than 900 nm is used. It suffices that the polarization characteristic of the pair of the polarizing plates 250 greatly decreases for light for reading the pattern 260, and it suffices that the transmittance of the pair of the polarizing plates 250 for the peak wavelength of the light emitted from the light source 140 is not lower than 70%.

Figure 4A:
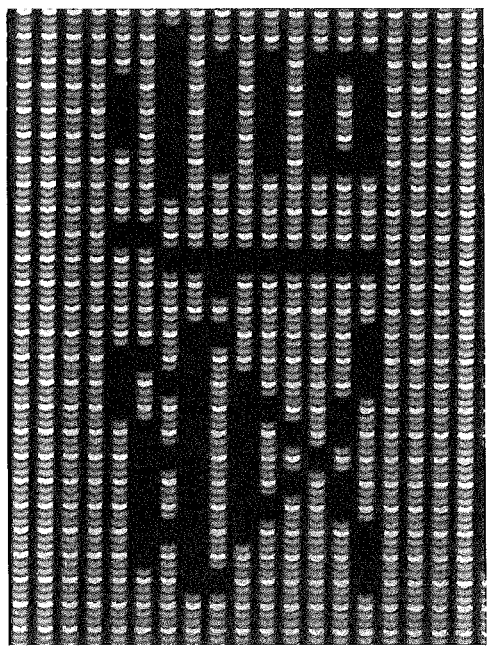
FIG. 4A is a diagram showing an image of the liquid crystal display section according to Embodiment 1 captured with visible light.
Figure 4B:
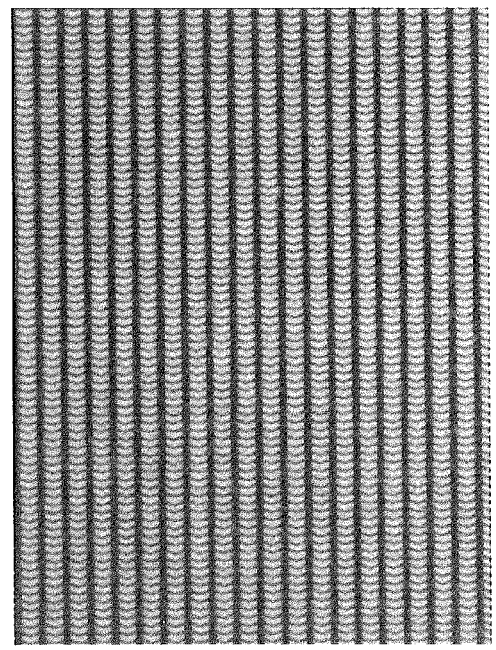
FIG. 4B is a diagram showing an image of the liquid crystal display section according to Embodiment 1 captured with infrared light of 900 nm.

FIG. 4A is an image of a part of the screen of the liquid crystal display section 220 captured with illumination light having a visible wavelength in Embodiment 1, and FIG. 4B is an image of the same region as that in FIG. 4A, which is captured in the same display state as that in FIG. 4A with illumination light having a wavelength of 900 nm at which the function of the polarizing plates 250 is lost. In the image captured with the illumination light having the visible wavelength, a difference in transmittance between each pixel is clearly observed as a difference between the orientation states of the crystal molecules of the respective pixels of the liquid crystal display section 220. Meanwhile, in the image captured with the illumination light having a wavelength of 900 nm, each pixel is observed as being the same although, similarly to the image captured at the visible wavelength, there are portions where the orientation state of the crystal molecules of each pixel of the liquid crystal layer 221 is different from those of the other. That is, if light having a peak wavelength of not lower than 900 nm is used as illumination light, it is possible to read the pattern 260 without influence of the orientation state of the crystal molecules of each pixel of the liquid crystal display section 220.

[1-2. Light Source Section]

Figure 5:
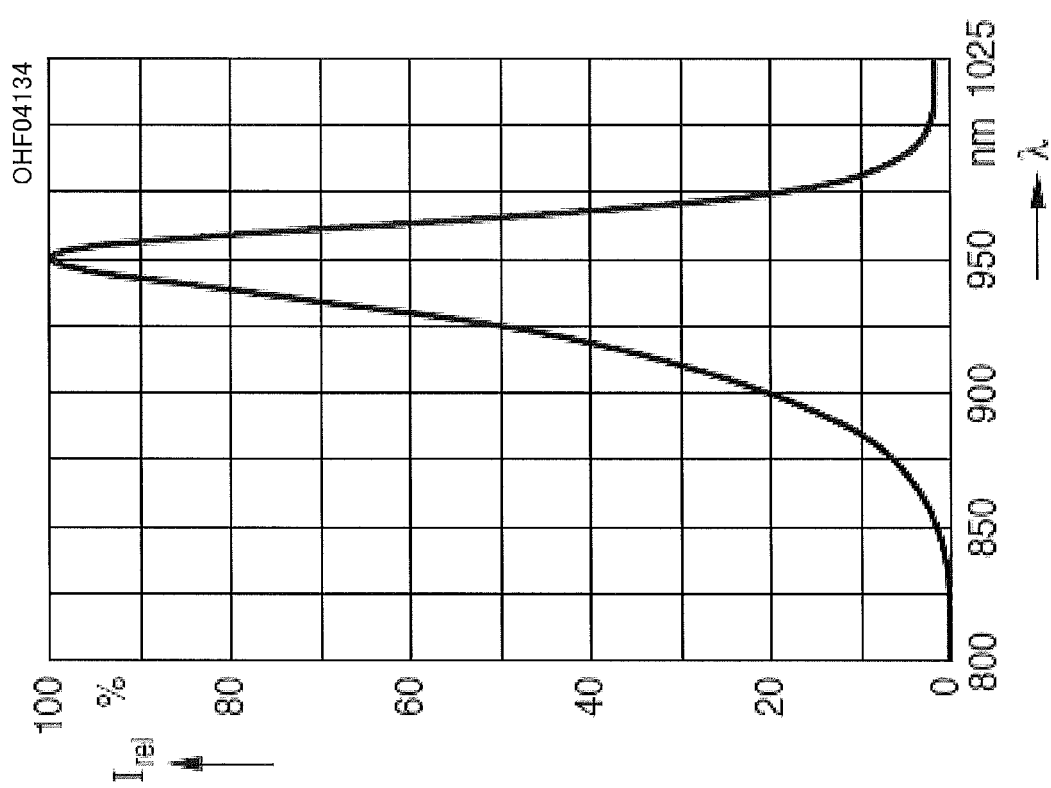
FIG. 5 is a diagram showing a wavelength characteristic of a light source according to Embodiment 1.

FIG. 5 shows a wavelength characteristic of the light source 140 in Embodiment 1. An infrared LED, SFH-4248, manufactured by OSRAM GmbH is used as the light source 140. The light source 140 has a peak wavelength of 950 nm, and the polarizing plates 250 (NPF polarizing plates, manufactured by Nitto Denko Corporation) do not substantially have a polarization characteristic for light having this peak wavelength. The light source 140 is a light source which is most appropriate for the display control system 100 according to the present embodiment.

[1-3. Pattern Layer]

Each pattern 260 (each dot 42) is formed from a material that transmits visible light (light having a wavelength of 400 to 700 nm) and absorbs infrared light (light having a wavelength of not lower than 700 nm). Each pattern 260 is formed from, for example, a material that absorbs infrared light having a wavelength of not lower than 800 nm. Specifically, each pattern 260 has a transmittance of not lower than 70% for light in a wavelength range of 400 nm to 700 nm, and has a minimum value of transmittance of less than 30% for light in a wavelength range of a wavelength, at which the transmittance of the pair of the polarizing plates 250 is not lower than 70% (850 nm in FIG. 3), to 1000 nm. Examples of the material of each pattern 260 (the material of each dot 42) include compounds such as diimmonium-based compounds, phthalocyanine-based compounds, and cyanine-based compounds. These materials may be used singly or may be mixed and used. A diimmonium salt-based compound is preferably included as a diimmonium-based compound.

Figure 6:
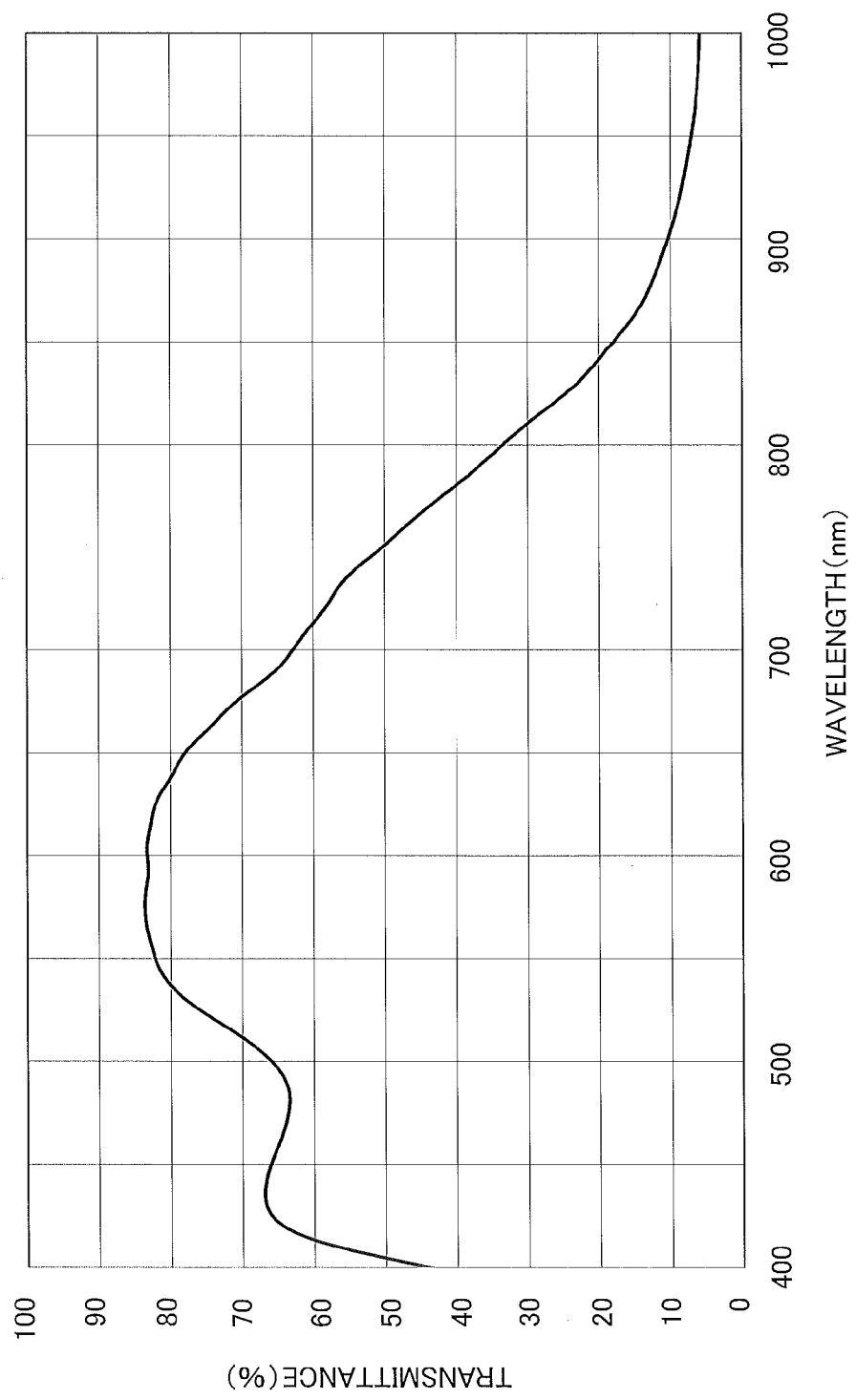
FIG. 6 is a diagram showing a wavelength characteristic of the transmittance of the material of each pattern according to Embodiment 1.

FIG. 6 shows a wavelength characteristic of the transmittance of the infrared absorbing material used for each pattern 260 (the material of each dot 42) in Embodiment 1. The thickness of each pattern 260 is, for example, 9 microns. Each pattern 260 has a transmittance of not higher than 10% at the intensity peak wavelength (950 nm) of the light source 140 (the LED manufactured by OSRAM GmbH). Thus, an image is obtained which has a high contrast between the region where the pattern 260 is formed and the region where no pattern 260 is formed, which high contrast is required in order for the position identification section 160 to identify a position. On the other hand, at a visible wavelength, the display control system 100 has to serve as a display device. That is, the display control system 100 has to exert a function to display a visible image. Each pattern 260 has a transmittance of not lower than 70% as an average value in the wavelength range of visible light (400 to 700 nm). This transmittance is sufficiently high in view of the occupation area of the pattern 260 with respect to the display surface. Thus, it is possible to realize a display brightness at a practical level.

The pattern layer 230 functions at any position between the diffuse reflection plate 240 and the front surface of the display device 120. Thus, the pattern layer 230 may be disposed at any position (e.g., at the back side relative to the liquid crystal layer 221) as long as the pattern layer 230 is disposed at a front side (an upper side in FIG. 1) relative to the diffuse reflection plate 240. However, in view of a situation where the display device 120 is modularized and shipped, the pattern layer 230 is desirably attached at the front side of the display device 120 relative to the liquid crystal display section 220 by means of a sheet or the like.

2. Advantageous Effects Etc.

As described above, in the present embodiment, the display control system 100 includes the light source 140, the diffuse reflection plate 240, the liquid crystal display panel 220, the pattern layer 230, the position identification device 160, and the display controller 130. The diffuse reflection plate 240 reflects the light emitted from the light source 140. The liquid crystal display panel 220 includes the pair of the polarizing plates 250 which polarize light having a wavelength of 400 nm to 700 nm, and transmits the light reflected on the diffuse reflection plate 240. The patterns 260 which absorb the infrared light reflected on the diffuse reflection plate 240 and from each of which a position (display position) on the display surface is allowed to be identified are formed in the pattern layer 230. The position identification device 160 identifies a position on the display surface from the pattern 260. The display controller 130 controls display information to be displayed on the liquid crystal display panel 220, in accordance with the identified position. At the peak wavelength of the light emitted from the light source 140, the transmittance of the pair of the polarizing plates 250 having transmission axes perpendicular to each other is not lower than 70%. Accordingly, the polarization characteristic of the polarizing plates 250 (polarizers) of the liquid crystal display panel 220 greatly decreases. Thus, for the emission light of the light source 140, the transmittance of each pixel does not greatly change due to the orientation state of the crystal molecules of each pixel. Therefore, it is possible to realize a display control system 100 which allows a pointing input to be stably performed without influence of display contents of the display device 120. In the case where the pair of the polarizing plates 250 having the wavelength characteristic shown in FIG. 3 are used, a light source 140 which has a transmittance of 70% at 850 nm and has a peak wavelength of not lower than 850 nm may be used.

In the present embodiment, in the display control system 100, the peak wavelength of the light emitted from the light source 140 is 950 nm. For light of 950 nm, the transmittance of the pair of the polarizing plates 250 is not lower than 90% as shown in FIG. 3. Accordingly, the polarization characteristic of the polarizing plates 250 (polarizers) of the liquid crystal display panel 220 for the emission light of the light source 140 substantially disappears. Thus, even when the orientation state of the crystal molecules of each pixel changes, the transmittance of each pixel almost does not change. Therefore, it is possible to realize a display control system 100 which allows a pointing input to be stably performed without influence of display contents of the display device 120.

In the present embodiment, for the light emitted from the light source 140, the transmittance of the pair of the polarizing plates 250 is not lower than 90% even as an average for all the frequency components of the light. It suffices that for the light emitted from the light source 140, the transmittance of the pair of the polarizing plates 250 is not lower than 90% even as an average for all the frequency components of the light.

In the present embodiment, in the display control system 100, each pattern 260 of the pattern layer 230 has a light absorption ratio of not lower than 70% at a wavelength of 950 nm. Accordingly, the polarization characteristic of the polarizing plates (polarizers) of the liquid crystal display panel 220 for light which is well absorbed by each pattern 260 substantially disappears. Thus, even when the orientation state of the crystal molecules of each pixel changes, the transmittance of each pixel almost does not change. Therefore, it is possible to realize a display control system 100 which allows a pointing input to be stably performed without influence of display contents of the display device 120.

In the present embodiment, in the display control system 100, the transmittance of each pattern 260 for visible light having a wavelength of 400 nm to 700 nm is not lower than 70%. Thus, it is possible to maintain the brightness of the liquid crystal display panel 220 at a practical level. That is, a significant decrease in the brightness of the display device 120 is not caused, and it is possible to maintain the display quality of the display control system 100.

In the present embodiment, in the display control system 100, the pattern layer 230 is disposed at the user viewing side (the front side) of the liquid crystal display panel 220. Accordingly, it is possible to attach the pattern layer 230 after a liquid crystal module is completed, and thus it is easy to manufacture the display device 120. In addition, even after a consumer buys the display device 120, if a sheet having patterns 260 printed thereon is attached to the display device 120, it is possible to make a display device 120 that supports a pointing input.

In the present embodiment, the display device 120 includes the liquid crystal display panel 220 and the pattern layer 230. The liquid crystal display panel 220 includes the pair of the polarizing plates 250 having transmission axes perpendicular to each other, and displays a visible image on the display surface thereof by using the pair of the polarizing plates 250. The patterns 260 which are externally and optically readable and from each of which a position (display position) on the display surface is allowed to be identified are formed in the pattern layer 230. Each pattern 260 of the pattern layer 230 has a transmittance of not lower than 70% for light in a wavelength range of 400 nm to 700 nm. Furthermore, each pattern 260 has a minimum value of transmittance of less than 30% for light in a wavelength range of a wavelength, at which the transmittance of the pair of the polarizing plates 250 is 70% in a near-infrared range (700 to 2500 nm), to 1000 nm (in each pattern 260 of Embodiment 1, a minimum value of transmittance for light in a wavelength range of 850 nm, at which the transmittance of the pair of the polarizing plates 250 is 70%, to 1000 nm is less than 10%). Thus, a significant decrease in the brightness of the display device 120 is not caused. In addition, it is possible to stably perform a pointing input without influence of display contents of the display device 120.

OTHER EMBODIMENTS

As described above, Embodiment 1 has been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in Embodiment 1 can be combined to provide a new embodiment.

Other embodiments will be described below.

In Embodiment 1, the light source 140 is provided within the pointing device 110. However, it is only necessary to be able to substantially illuminate, with infrared light, an area where the pointing device 110 reads the pattern 260. Thus, the light source 140 may be provided within the display device 120, or may be provided near the display device 120.

In Embodiment 1, the pointing device 110 is a pen type input device, but is not limited thereto. The pointing device 110 may be a mouse type input device.

In Embodiment 1, the image sensor 200 may be a CMOS image sensor or a CCD image sensor.

In Embodiment 1, each pattern is formed in a unit area of 6 dots×6 dots, but is not limited thereto. The number of the dots constituting the unit area may be set as appropriate in accordance with the design of the pointing device 110 or the display device 120.

In Embodiment 1, each pattern 260 is composed of circular dots, but is not limited thereto. Each pattern may be composed of a plurality of marks represented by figures such as triangles or characters such alphabet letters, instead of the dots.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A display control system comprising:
a display panel that includes a pair of polarizing plates having transmission axes perpendicular to each other, the display panel being configured to display a visible image on a display surface thereof by using the pair of polarizing plates;
a pattern layer that is disposed so as to overlap the display surface and has formed therein a plurality of patterns each representing information regarding a position on the display surface;
a light source that emits light to be absorbed by the patterns, from a front side of the display panel;
a reflector that is provided at a back side of the display panel and the pattern layer;
an identification device that (i) reads the pattern from the light which is emitted from the light source, is reflected on the reflector, and then passes through the display panel and the pattern layer, and (ii) identifies a position, on the display surface, of the pattern; and
a display controller that controls display information to be displayed on the display panel, in accordance with the position identified by the identification device, wherein
a transmittance of the pair of polarizing plates at a peak wavelength of the light emitted from the light source is not lower than 70%.

2. The display control system according to claim 1, wherein the transmittance of the pair of polarizing plates at the peak wavelength of the light emitted from the light source is not lower than 90%.

3. The display control system according to claim 1, wherein the peak wavelength of the light emitted from the light source is 950 nm.

4. The display control system according to claim 1, wherein each pattern has a light absorption ratio of not lower than 70% at a wavelength of 950 nm.

5. The display control system according to claim 1, wherein each pattern has a transmittance of not lower than 70% for light in a wavelength range of 400 nm to 700 nm.

6. The display control system according to claim 1, wherein the pattern layer is disposed at a user viewing side of the display panel.

7. A display control system comprising:
a display panel that include a pair of polarizing plates having transmission axes perpendicular to each other, the display panel being configured to display a visible image on a display surface thereof by using the pair of polarizing plates;
a pattern layer that is disposed so as to overlap the display surface and has formed therein a plurality of patterns each representing information regarding a position on the display surface;
a light source that emits light to be absorbed by the patterns, from a front side of the display panel;
a reflector that is provided at a back side of the display panel and the pattern layer;
an identification device that (i) reads the pattern from the light which is emitted from the light source, is reflected on the reflector, and then passes through the display panel and the pattern layer, and (ii) identifies a position, on the display surface, of the pattern; and
a display controller that controls display information to be displayed on the display panel, in accordance with the position identified by the identification device, wherein
a transmittance of the pair of polarizing plates for the light emitted from the light source is not lower than 70% as an average for all frequency components of the light.

8. A display device comprising:
a display panel that includes a pair of polarizing plates having transmission axes perpendicular to each other, the display panel being configured to display a visible image on a display surface thereof by using the pair of polarizing plates; and
a pattern layer that is disposed so as to overlap the display surface and has formed therein a plurality of patterns each representing information regarding a position on the display surface, wherein
each pattern has a transmittance of not lower than 70% for light in a wavelength range of 400 nm to 700 nm, and has a minimum value of transmittance of less than 30% for light in a wavelength range of a wavelength, at which a transmittance of the pair of polarizing plates is 70% in a near-infrared range, to 1000 nm.

\* \* \* \* \*